US008165709B1

(12) United States Patent
Rudy

(10) Patent No.: US 8,165,709 B1
(45) Date of Patent: Apr. 24, 2012

(54) FOUR PAD SELF-CALIBRATING ELECTRONIC LAPPING GUIDE

(75) Inventor: Steven C. Rudy, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 324 days.

(21) Appl. No.: 12/393,886

(22) Filed: Feb. 26, 2009

(51) Int. Cl.
*G06F 19/00* (2011.01)

(52) U.S. Cl. ........................................ 700/121; 700/160

(58) Field of Classification Search .................... 700/121
See application file for complete search history.

(56) References Cited

U.S. PATENT DOCUMENTS

| 4,157,497 | A | | 6/1979 | Eisen et al. |
| 4,670,732 | A | | 6/1987 | Church |
| 4,675,986 | A | | 6/1987 | Yen |
| 5,065,483 | A | | 11/1991 | Zammit |
| 5,210,667 | A | | 5/1993 | Zammit |
| 5,361,547 | A | * | 11/1994 | Church et al. ............... 451/5 |
| 5,597,340 | A | * | 1/1997 | Church et al. ............... 451/5 |
| 5,678,086 | A | * | 10/1997 | Gandola et al. ........... 396/319 |
| 5,722,155 | A | | 3/1998 | Stover et al. |
| 5,742,995 | A | | 4/1998 | Amin et al. |
| 5,772,493 | A | | 6/1998 | Rottmayer et al. |
| 5,876,264 | A | * | 3/1999 | Church et al. ............... 451/5 |
| 6,003,361 | A | | 12/1999 | Amin et al. |
| 6,027,397 | A | * | 2/2000 | Church et al. ............... 451/1 |
| 6,047,224 | A | | 4/2000 | Stover et al. |
| 6,083,081 | A | | 7/2000 | Fukuroi et al. |
| 6,193,584 | B1 | | 2/2001 | Rudy et al. |
| 6,288,870 | B1 | * | 9/2001 | Saliba ........................ 360/121 |
| 6,347,983 | B1 | | 2/2002 | Hao et al. |
| 6,364,743 | B1 | | 4/2002 | Pust et al. |
| 6,399,401 | B1 | | 6/2002 | Kye et al. |
| 6,475,064 | B2 | * | 11/2002 | Hao et al. ..................... 451/5 |
| 6,532,646 | B2 | | 3/2003 | Watanuki |
| 6,609,948 | B1 | | 8/2003 | Fontana, Jr. et al. |
| 6,623,330 | B2 | | 9/2003 | Fukuroi |
| 6,674,610 | B1 | * | 1/2004 | Thomas et al. .......... 360/123.36 |

(Continued)

FOREIGN PATENT DOCUMENTS

JP 2000067408 A 3/2000

OTHER PUBLICATIONS

Matsushita, et al., "Elaborate Precision Machining Technologies for Creating High Added Value at Low Cost", Fujitsu Sci. Tech. J., 43, 1, pp. 67-75, Jan. 2007.

Primary Examiner — Albert Decady
Assistant Examiner — Anthony Whittington

(57) ABSTRACT

Lapping guides for use in fabrication of a magnetic recording head are provided. The lapping guides comprise a first differential electronic lapping guide (ELG) disposed in a first layer of the magnetic recording head. The first differential ELG has a first resistive element and a second resistive element between which is disposed a first common electrical lead. The lapping guides further comprise a second differential ELG disposed in a second layer of the magnetic recording head. The second differential ELG has a third resistive element and a fourth resistive element between which is disposed a second common electrical lead. The first and second differential ELGs share a common ground and a common current injection source. Remaining lapping distances at the first and second layers of the magnetic recording head are determined by measuring changing voltages across the first, second, third and fourth resistive elements, respectively.

30 Claims, 8 Drawing Sheets

U.S. PATENT DOCUMENTS

| | | | |
|---|---|---|---|
| 6,684,171 B2 | 1/2004 | Church et al. | |
| 6,699,102 B2 * | 3/2004 | Reiley et al. | 451/8 |
| 6,728,067 B2 | 4/2004 | Crawforth et al. | |
| 6,758,722 B2 | 7/2004 | Zhu | |
| 6,760,197 B2 | 7/2004 | Boutaghou et al. | |
| 6,786,803 B2 | 9/2004 | Crawforth et al. | |
| 6,793,557 B2 * | 9/2004 | Bunch et al. | 451/5 |
| 6,846,222 B2 * | 1/2005 | Church et al. | 451/5 |
| 6,857,937 B2 | 2/2005 | Bajorek | |
| 6,884,148 B1 | 4/2005 | Dovek et al. | |
| 6,935,923 B2 * | 8/2005 | Burbank et al. | 451/5 |
| 6,950,289 B2 | 9/2005 | Lam et al. | |
| 6,982,042 B2 | 1/2006 | Church et al. | |
| 7,014,530 B2 * | 3/2006 | Kasiraj et al. | 451/8 |
| 7,139,152 B2 | 11/2006 | Mahnad et al. | |
| 7,149,061 B2 | 12/2006 | Yamakura et al. | |
| 7,206,172 B2 | 4/2007 | Ding et al. | |
| 7,244,169 B2 | 7/2007 | Cyrille et al. | |
| 7,245,459 B2 | 7/2007 | Cyrille et al. | |
| 7,268,976 B2 | 9/2007 | Yamakura et al. | |
| 7,271,982 B2 | 9/2007 | MacDonald et al. | |
| 7,272,883 B2 | 9/2007 | Le et al. | |
| 7,287,316 B2 | 10/2007 | Kasahara et al. | |
| 7,333,300 B2 | 2/2008 | Church et al. | |
| 7,359,152 B2 | 4/2008 | Matono et al. | |
| 7,360,296 B2 | 4/2008 | Cyrille et al. | |
| 7,393,262 B2 | 7/2008 | Biskeborn | |
| 7,422,511 B2 | 9/2008 | Fukuroi | |
| 7,551,406 B1 * | 6/2009 | Thomas et al. | 360/317 |
| 7,554,767 B1 * | 6/2009 | Hu et al. | 360/125.3 |
| 7,564,110 B2 * | 7/2009 | Beach et al. | 257/427 |
| 7,603,762 B2 | 10/2009 | Baer et al. | |
| 7,643,250 B2 | 1/2010 | Araki et al. | |
| 7,716,814 B2 | 5/2010 | Sasaki et al. | |
| 7,770,281 B2 | 8/2010 | Pentek | |
| 7,788,796 B2 | 9/2010 | Hsiao et al. | |
| 7,861,400 B2 * | 1/2011 | Lille | 29/603.09 |
| 2001/0004800 A1 | 6/2001 | Yoshida et al. | |
| 2001/0051491 A1 * | 12/2001 | Hao et al. | 451/5 |
| 2002/0012204 A1 | 1/2002 | Boutaghou et al. | |
| 2002/0173227 A1 | 11/2002 | Lam et al. | |
| 2003/0020467 A1 | 1/2003 | Kasahara et al. | |
| 2003/0021069 A1 | 1/2003 | Crawforth et al. | |
| 2004/0009739 A1 | 1/2004 | Zhu | |
| 2004/0075942 A1 * | 4/2004 | Bajorek | 360/122 |
| 2004/0097173 A1 | 5/2004 | Crawforth et al. | |
| 2004/0179310 A1 | 9/2004 | Lam et al. | |
| 2005/0023673 A1 | 2/2005 | Nowak | |
| 2005/0028354 A1 | 2/2005 | Shindo et al. | |
| 2005/0070206 A1 * | 3/2005 | Kasiraj et al. | 451/5 |
| 2005/0164607 A1 * | 7/2005 | Bajorek | 451/5 |
| 2005/0180048 A1 | 8/2005 | MacDonald et al. | |
| 2005/0185345 A1 | 8/2005 | Ding et al. | |
| 2005/0219752 A1 | 10/2005 | Takahashi | |
| 2006/0027528 A1 | 2/2006 | Church et al. | |
| 2006/0028770 A1 | 2/2006 | Etoh et al. | |
| 2006/0034021 A1 | 2/2006 | Wu | |
| 2006/0044683 A1 | 3/2006 | Matono et al. | |
| 2006/0103990 A1 | 5/2006 | Ito et al. | |
| 2006/0126222 A1 | 6/2006 | Aoki et al. | |
| 2006/0139802 A1 | 6/2006 | Sasaki et al. | |
| 2006/0168798 A1 | 8/2006 | Naka | |
| 2007/0008660 A1 | 1/2007 | Yamakura et al. | |
| 2007/0070543 A1 * | 3/2007 | Gunder et al. | 360/126 |
| 2007/0246761 A1 * | 10/2007 | Beach et al. | 257/295 |
| 2008/0013219 A1 | 1/2008 | Wu | |
| 2008/0072418 A1 | 3/2008 | Kondo et al. | |
| 2008/0144215 A1 | 6/2008 | Hsiao et al. | |
| 2008/0273275 A1 * | 11/2008 | Lille | 360/319 |
| 2009/0152235 A1 * | 6/2009 | Hsiao et al. | 216/22 |
| 2009/0211081 A1 * | 8/2009 | Boone et al. | 29/603.15 |
| 2009/0268348 A1 * | 10/2009 | Bonhote et al. | 360/313 |
| 2010/0162556 A1 * | 7/2010 | Guruz et al. | 29/603.16 |
| 2010/0165513 A1 * | 7/2010 | Bonhote et al. | 360/244 |
| 2010/0208391 A1 * | 8/2010 | Gokemeijer | 360/314 |

* cited by examiner

FOUR PAD SELF-CALIBRATING ELECTRONIC LAPPING GUIDE

FIELD OF THE INVENTION

The present invention generally relates to electronic lapping guides and, in particular, relates to four pad self-calibrating electronic lapping guides.

BACKGROUND OF THE INVENTION

Magnetic disk drives are used to store and retrieve data for digital electronic apparatuses such as computers. In FIGS. 1A and 1B, a magnetic disk drive 10 of the prior art includes a sealed enclosure 12, a disk drive motor 14, a magnetic disk 16, supported for rotation by a spindle S1 of motor 14, an actuator 18 and an arm 20 attached to a spindle S2 of actuator 18. A suspension 22 is coupled at one end to the arm 20, and at its other end to a read/write head or transducer 24. The transducer 24 typically includes an inductive write element with a magnetoresistive read element (shown in FIG. 1C). As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Various magnetic "tracks" of information can be read from the magnetic disk 16 as the actuator 18 causes the transducer 24 to pivot in a short arc as indicated by the arrows P. The design and manufacture of magnetic disk drives is well known to those skilled in the art.

FIG. 1C depicts a magnetic read/write head 30 including a write element 32 and read element 34. The edges of the write element 32 and read element 34 also define an air bearing surface ABS in a plane 33, which flies above the surface of the magnetic disk 16 during operation.

Read element 34 includes a first shield 44, an intermediate layer 38 which serves as a second shield, and a read sensor 46 located between the first shield 44 and the intermediate layer 38. The read sensor 46 has a particular stripe height, SH, and a particular location between the first shield 44 and the second shield 38, both of which are chosen to attain particular read performance. Control of stripe height is important in controlling device resistance, device output amplitude, device bias point and consequently many related measures of performance. MR sensors can be used with a variety of stripe heights, with a typical SH being smaller than about 2 microns, including much less than 1 micron. Further, although the read sensor 46 is shown in FIG. 1C as a shielded single-element vertical read sensor, the read element 34 can take a variety of forms as is known to those skilled in the art, such as unshielded read sensors. The design and manufacture of magnetoresistive heads, such as read sensor 46, are well known to those skilled in the art.

Write element 32 is typically an inductive write element including the intermediate layer 38 which serves as a first yoke element or pole, and a second yoke element or pole 36, defining a write gap 40 therebetween. The first yoke element 38 and second yoke element 36 are configured and arranged relative to each other such that the write gap 40 has a particular nose length, NL. Also included in write element 32, is a conductive coil 42 that is positioned within a dielectric medium 43. As is well known to those skilled in the art, these elements operate to magnetically write data on a magnetic medium such as a magnetic disk 16.

The formation of a read/write head 30 begins with a wafer 50, as shown in FIG. 1D, which includes, formed over a substrate, sets of several layers or films of various materials that form an array of read/write heads (not shown), including the elements of the read/write head 30 that are shown in FIG. 1C. The wafer 50 is then divided into multiple slider bars 52 such that each slider bar 52 has a first cut surface, or edge, 54 and a second cut surface, or edge, 56 substantially parallel to each other. As can be better seen in FIG. 1E, each slider bar 52 may include several read/write heads 60 in series along the bar. For example, a typical slider bar may include about fifty to sixty (50-60) read/write heads 60. As is shown in FIG. 1E, the read/write heads 60 can be of different configuration, however, alternatively each of the write/read heads 60 along the slider bar 52 can be of approximately the same configuration.

As is shown in FIG. 1E, the second cut surface 56 is formed such that the read/write heads 60 extend through to the second cut surface 56. Thus, at the second cut surface 56, the read/write heads 60 are exposed and therefore available for removing material along the second cut surface 56 in a process termed lapping. Alternatively, the read/write heads 60 can extend to near the second cut surface 56, without being initially exposed. In such a case, the read/write heads 60 can become exposed and material can be removed therefrom during the lapping process.

The goal of lapping is to remove material from the second cut surface 56, which defines a lapping plane L, to form the ABS (also shown in FIG. 1C) of each of the read/write heads 60 in the plane 33. More particularly, it is the objective of the lapping process to define the ABS at a precise predetermined distance from the upper edge 64 of the read sensor 46 where the upper edge 64 is defined by wafer processes. In this way, the stripe height SH of the read sensor 46 (shown in FIG. 1C) is defined substantially orthogonal to the lapping plane L, and the nose length NL is similarly defined substantially orthogonal to the lapping plane L. After lapping, the read/write heads are then each cut from the slider bar to form individual read/write heads.

FIG. 1F shows a typical lapping machine 70. The slider bar 52 is held along the first cut surface 54 by a jig 72. In turn, the jig 72 is contacted by pistons 74 at various bending points 76 along the length of the jig 72. Pistons 74 may be, for example, dual action air cylinders, and are configured to deflect the jig 72 at the bending points 76 by a particular amount. To obtain this particular amount, a controller 78 is used to regulate the operation of the pistons 74. The slider bar 52 is further oriented such that the second cut surface 56 lies substantially parallel to an upper surface 80 of a lapping plate 82. During lapping, an abrasive material, for example a diamond slurry, is introduced between the second cut surface 56 of the slider bar 52 and the upper surface 80 of the lapping plate 82. When the second cut surface 56 is brought into contact or near-contact with the upper surface 80, the slider bar 52 and the lapping plate 82 are moved relative to each other within the plane defined by the second cut surface 56 and the upper surface 80. This movement, along with the forces acting to press together the upper surface 80 and the second cut surface 56 and with the abrasive material placed therebetween, acts to abrasively lap the second cut surface 56 and thereby the read/write heads 60.

Because of the critical nature of the stripe height, SH, it is important to end the lapping process at the particular point which attains the correct stripe height. While lapping times, lapping pressures, and other lapping parameters could be standardized for particular types of slider bars 52, such a method can be ineffective due to fabrication variations such as in the deposition of materials of the read/write heads 60, or the wafer cut locations relative to the read/write heads. More particularly, some fabrication variations may exist within a single slider bar or a single wafer, with variations increasing with distance, while others may exist between different wafers (i.e., wafer-to-wafer variation). Additionally, as the read and write elements of a single read/write head are separated from one another by some distance, it is important for the lapping process to proceed at the correct angle, such that both the SH and the NL of the lapped read/write head are properly oriented with respect to the second cut surface. Therefore, it is beneficial for the controller to have some indication or feedback of the actual stripe height of the read sensor 46 during the lapping process.

SUMMARY OF THE INVENTION

Various embodiments of the present invention solve the foregoing problem by providing lapping guides for use in the fabrication of a magnetic read/write head, whereby both the stripe height (SH) and nose length (NL) of a read/write head can be determined during lapping, such that the angle of the air bearing surface (ABS) can be selected to optimize both the SH and the NL.

According to one aspect of the subject disclosure, lapping guides for use in fabrication of a magnetic recording head are provided. The lapping guides comprise a first differential electronic lapping guide (ELG) disposed in a first layer of the magnetic recording head. The first differential ELG has a first resistive element and a second resistive element between which is disposed a first common electrical lead. The lapping guides further comprise a second differential ELG disposed in a second layer of the magnetic recording head. The second differential ELG has a third resistive element and a fourth resistive element between which is disposed a second common electrical lead. The first and second differential ELGs share a common ground and a common current injection source. Remaining lapping distances at the first and second layers of the magnetic recording head are determined by measuring changing voltages across the first, second, third and fourth resistive elements, respectively.

According to another aspect of the subject disclosure, a method for making a magnetic recording head comprises the step of lapping along a lapping plane of a slider bar. The slider bar includes a first differential electronic lapping guide (ELG) disposed in a first layer. The first differential ELG has a first resistive element and a second resistive element between which is disposed a first common electrical lead. The slider bar further includes a second differential ELG disposed in a second layer. The second differential ELG has a third resistive element and a fourth resistive element between which is disposed a second common electrical lead. The first and second differential ELGs share a common ground and a common current injection source. The method further comprises the step of measuring, while the lapping occurs, a first voltage $V_1$ between the common current injection source and the common ground, a second voltage $V_2$ between the first common electrical lead and the common ground, and a third voltage $V_3$ between the second common electrical lead and the common ground. The method further comprises the step of determining whether to change either a rate of the lapping or an angle of the slider bar based upon the measured first, second and third voltages.

A machine readable medium carrying one or more sequences of instructions for making a magnetic recording head, wherein execution of the one or more sequences of instructions by one or more processors causes the one or more processors to perform the step of lapping along a lapping plane of a slider bar. The slider bar includes a first differential electronic lapping guide (ELG) disposed in a first layer. The first differential ELG has a first resistive element and a second resistive element between which is disposed a first common electrical lead. The slider bar further includes a second differential ELG disposed in a second layer. The second differential ELG has a third resistive element and a fourth resistive element between which is disposed a second common electrical lead. The first and second differential ELGs share a common ground and a common current injection source. The execution of the one or more sequences of instructions by the one or more processors causes the one or more processors to further perform the step of measuring, while the lapping occurs, a first voltage $V_1$ between the common current injection source and the common ground, a second voltage $V_2$ between the first common electrical lead and the common ground, and a third voltage $V_3$ between the second common electrical lead and the common ground. The execution of the one or more sequences of instructions by the one or more processors causes the one or more processors to further perform the step of determining whether to change either a rate of the lapping or an angle of the slider bar based upon the measured first, second and third voltages.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1A:
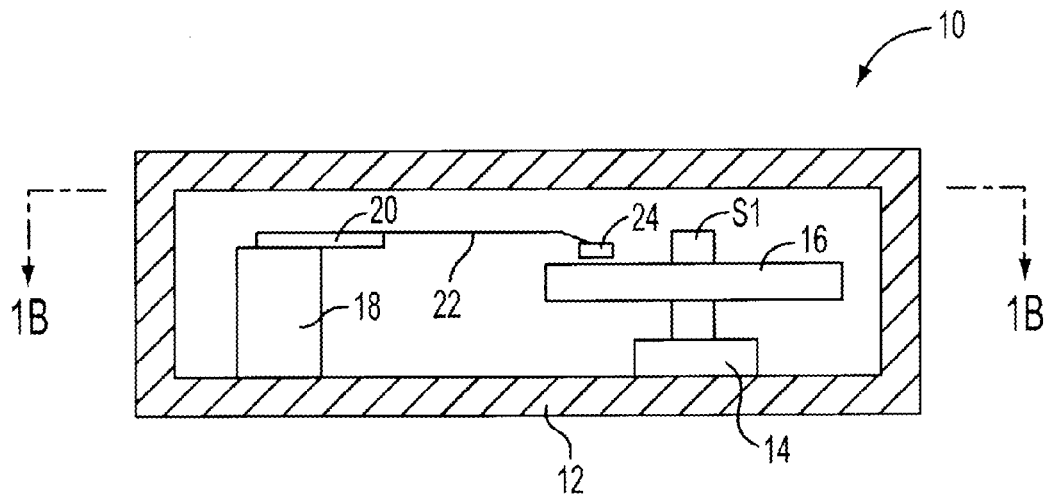
FIG. 1A is a partial cross-sectional front elevation view of a magnetic disk drive assembly.
Figure 1B:
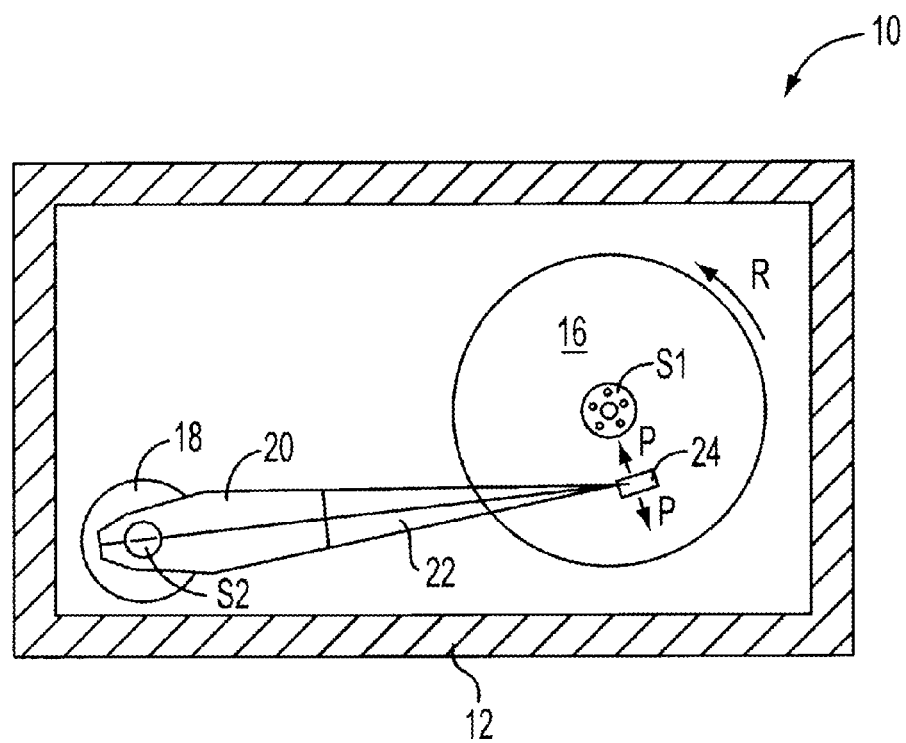
FIG. 1B is a top plan view taken along line 1B-1B of FIG. 1A.
Figure 1C:
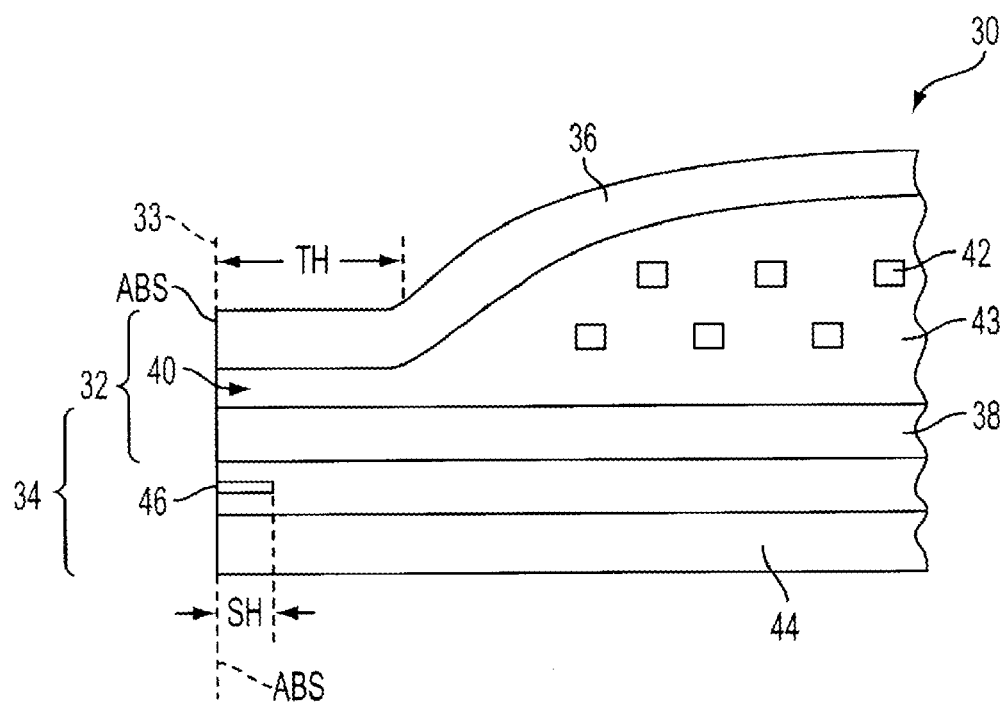
FIG. 1C is a cross-sectional side view of a read-write head incorporating a shielded magnetoresistive read sensor.
Figure 1D:
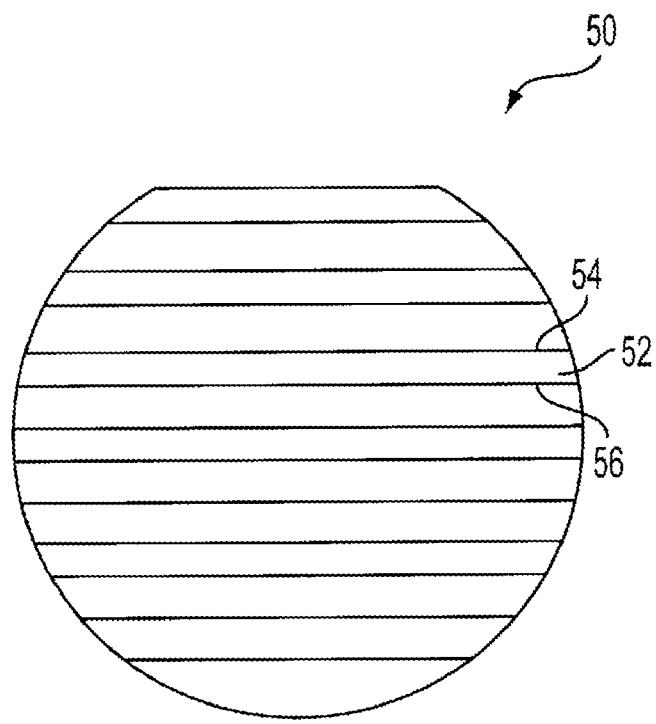
FIG. 1D is a plan view of a wafer including multiple slider bars that incorporate multiple read-write heads.
Figure 1E:
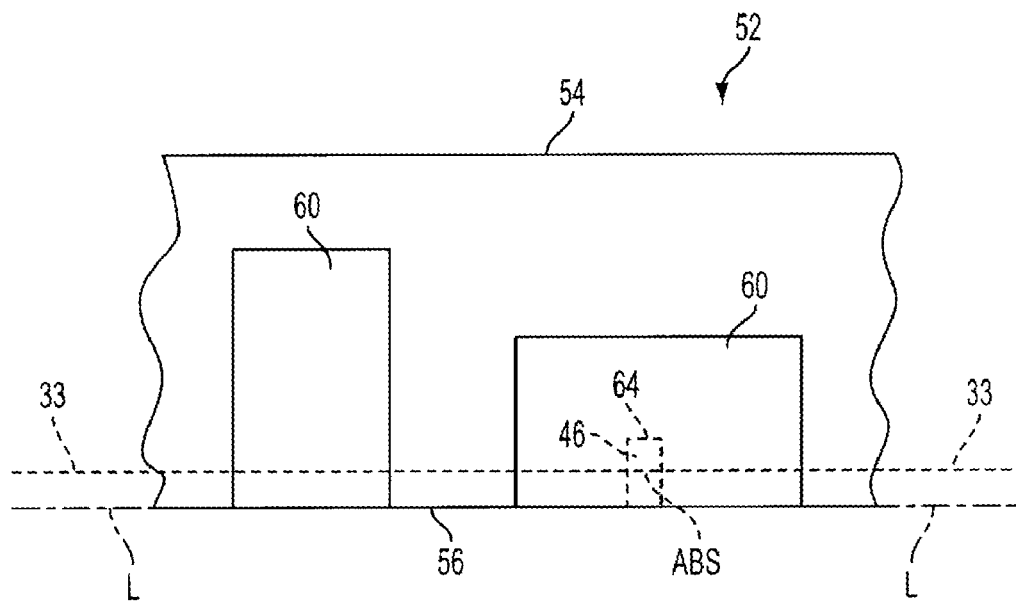
FIG. 1E is a partial plan view of an individual one of the slider bars shown in FIG. 1D.
Figure 1F:
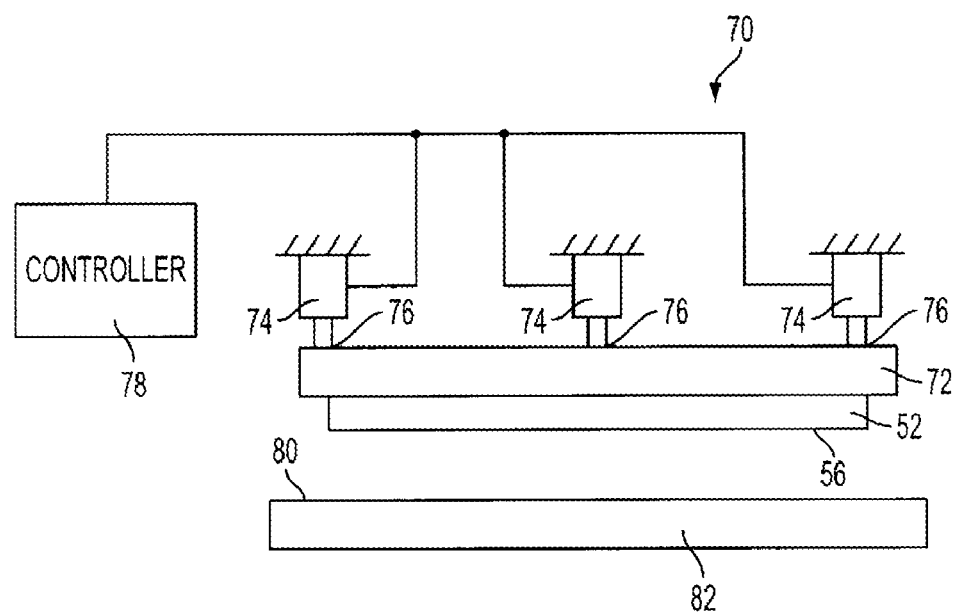
FIG. 1F is a schematic diagram of a lapping machine in which a slider bar is positioned.
Figure 2A:
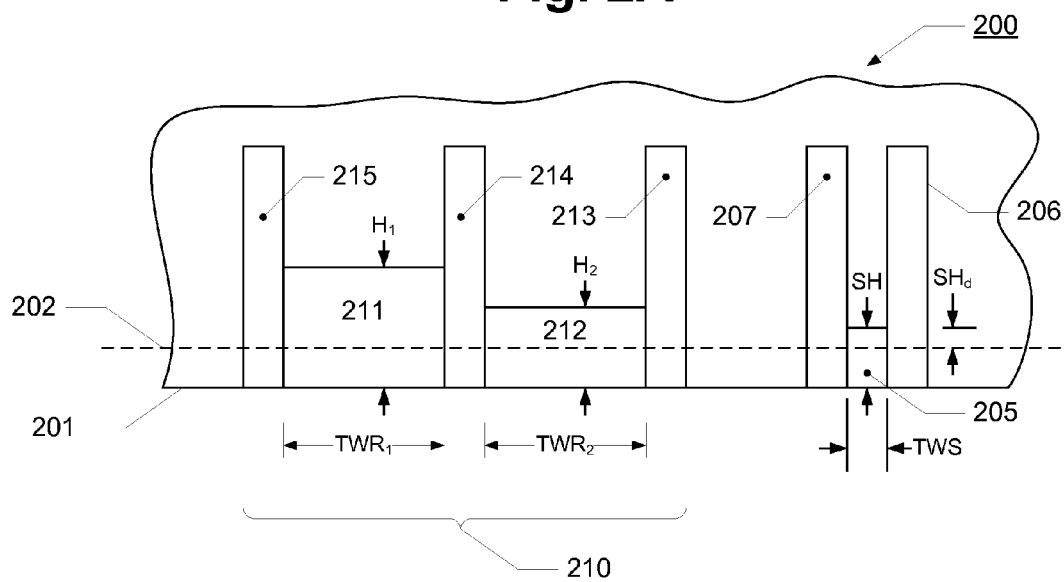
FIG. 2A is a partial cross-sectional view of an ELG embedded within a reader layer of a slider bar in accordance with one aspect of the subject disclosure.

FIG. 2A is a partial cross-sectional view of an electrical lapping guide (ELG) 210 embedded within a reader layer 200 of a slider bar according to one aspect of the subject disclosure. ELG 210 is located near a read sensor 205 with leads 206 and 207. Read sensor 205 may be a magnetoresistive read sensor, and is defined by a height, or stripe height, SH, and a trackwidth, TWS. The relatively close proximity to of ELG 210 to read sensor 205 minimizes fabrication (e.g., dimensional and material property) variations between read sensor 205 and ELG 210. In addition, other ELGs (not shown) may be located along the slider bar near other read sensors (not shown).

As further shown in FIG. 2A, ELG 210 includes a first resistive element 211, and a second resistive element 212 separated from the first resistive element 211 by a common lead 214, which is in electrical contact with both resistive elements. First resistive element 211 and second resistive element 212 also are electrically connected to a first electrical lead 215 and a second electrical lead 213, respectively. Leads 213, 214, and 215 are each electrically connected to a controller (not shown) through which currents can be applied to first resistive element 211 and second resistive element 212, and through which resistances of first resistive element 211 and of second resistive element 212 can be measured. Also, first resistive element 211 and second resistive element 212 are each defined by a particular height, $H_1$ and $H_2$, respectively, and by a particular width, or trackwidth, $TWR_1$ and $TWR_2$, respectively.

It should be noted that because of the proximity of the first resistive element and second resistive element, during the lapping process, the two are lapped at essentially the same rate, and thus the linear difference between $H_1$ and $H_2$ remains substantially the same. Although $TWR_1$ and $TWR_2$ are shown as approximately equal, according to other aspects of the subject disclosure they may differ. In either case, $TWR_1$ and $TWR_2$ are preferably substantially larger than TWS. The larger the size of $TWR_1$ and $TWR_2$, the less impact there is of other ELG components on endpoint determination, as is further discussed below. In addition, larger $TWR_1$ and $TWR_2$ minimize the impact on endpoint determination of trackwidth dimensional errors during the fabrication of the ELG resistive elements. For example, with appropriate dimensions, typical dimensional errors can result in about a 1% error, rather than a 10% error that can otherwise be experienced. For example, to obtain such benefits TWS can be about 100 nanometers or less, while $TWR_1$ and $TWR_2$ can be in the range of about 1 micron to about 100 microns (e.g., about 25 microns). The selection of particular $TWR_1$ and $TWR_2$ values is further influenced by the area available on a slider bar for the ELG versus the area occupied by read/write heads.

While FIG. 2A above has been illustrated and described with respect to a current-in-plane read element (e.g., spin valve, AMR, GMR, etc.), the scope of the present invention is not limited to such an arrangement. Rather, those of skill in the art will immediately recognize that the present invention has application to read/write heads in which a current-perpendicular-to-plane (CPP) read element is used instead (e.g., a TMR element or the like). Such a CPP read element may have a different arrangement of leads (e.g., in which the leads are electrically connected to the shields of the TMR read element), according to various aspects of the subject disclosure.

Preferably, the leads and junctions are formed such that the resistances of the leads are negligible relative to the resistances of resistive elements 211 and 212. For example, the leads resistance may be minimized by using low resistivity materials. The leads resistance can also be minimized by minimizing the distance over which the leads are formed only from the thin films utilized in read sensor fabrication by designing the via for contact between the thin films leads and the thicker conductors used in the write head process, in close proximity to the resistive elements. In addition, defining the trackwidths of the resistive elements to be substantially larger than the trackwidth of the sensor can minimize the relative impact of the leads and junction resistance because the resistance of resistive elements 211 and 212 are directly proportional to $TWR_1$ and $TWR_2$, respectively. For example, with a read sensor trackwidth of about 1 micron, $TWR_1$ and $TWR_2$ of the resistive elements in the range of about 10 microns to about 100 microns will increase the resistances of the ELG resistive elements by approximately one to two orders of magnitude with respect to the read sensor, resulting in the resistances of resistive elements 211 and 212 being the predominant terms in the ELG resistance.

The read sensor 205 is also defined by a height, or stripe height, SH. As illustrated in FIG. 2A, once a slicing operation has been performed to form a slider bar, the read sensor has a height SH, while the first and second resistive elements have heights $H_1$ and $H_2$, respectively. If the slicing operation does not cut through a resistive element, there will be no change in resistance of that resistive element until a lapping plane 201 reaches the lower edge of that resistive element.

During a lapping process, the slider bar is lapped along the lapping plane 201, over time reducing SH, along with $H_1$ and $H_2$, from the initial pre-lapped values until SH is equal to a desired, or target stripe height $SH_d$. It should be noted that when the read sensor, first resistive element, and second resistive element are formed of similar materials they will experience approximately the same lapping rates. Further, when they are located near each other along the slider bar, the differences between $H_1$, $H_2$, and SH will remain substantially constant throughout a lapping process.

To provide calibration before and up to the time the target stripe height is reached, initial lower edges of the resistive elements are below a final plane 202 which includes the read sensor ABS, and upper edges of the resistive elements are above the final plane 202. This criteria can be satisfied regardless of the position of the resistive element lower edges relative to the lower edge of the read sensor, and whether or not the initial lower edges of the resistive elements extend to the initial lapping plane. However, if the resistive elements do not extend to the initial lapping plane, the resistances will begin to change once the lapping plane 201 reaches the lower edges of the resistive elements.

According to one aspect of the subject disclosure, the resistive elements provide a changing signal throughout the lapping of the slider bar, from the initial lapping plane to the plane 202 which includes the read sensor ABS. To ensure that the resistive elements are lapped from the initial lapping plane, and therefore begin to change resistance from that point, the lower edges of the resistive elements extend to the initial lapping plane, thereby allowing the resistive elements to be lapped from the beginning of the lapping process. To account for variations and tolerances of the slider bar slicing operation, the distance between the wafer level lower edges of the resistive elements and the plane 202 may be greater than or equal to the distance between the plane 202 and the wafer level read sensor lower surface. However, with appropriate slicing of the slider bar to expose the first and second resistive elements, the wafer level lower surfaces of the resistive elements can alternatively be as close as or closer than the wafer level lower surface of the read sensor is to the plane 202.

To provide calibration until the lapping has formed the read sensor ABS (i.e., when SH is reduced to $SH_d$), the upper edges of the resistive elements extend above the plane 202, which includes the read sensor ABS. In other words, the distances between the initial lapping plane and the upper edges of the first and second resistive elements are greater than the distance between the initial lapping plane and the plane 202. Thus, for example, an SH of about 16 microns can be lapped to a $SH_d$ of about 1 micron. In that case, the initial $H_1$ could be about 19 microns, while $H_2$ could be about 17 microns. According to one aspect of the subject disclosure, while the absolute dimensions are somewhat affected by the tolerances of the slider bar slicing operation, the initial values of $H_1$ and $H_2$ may be at least about 15 microns larger than the target stripe height $SH_d$. According to another aspect of the subject disclosure, the initial values of $H_1$ and $H_2$ may be only 4 microns larger than the target stripe height $SH_d$. It may be desirable to design the ELG to have the smallest initial values of $H_1$ and $H_2$ practicable given the requirements of slider bar fabrication and lapping preparation.

According to one aspect of the subject disclosure, a goal during the lapping process is to change the rate of lapping as SH approaches the target stripe height $SH_d$, including stopping the lapping at an endpoint when SH is approximately equal to $SH_d$. At that time, the lapping plane 201 is coincident with plane 202 and incorporates the air bearing surface ABS.

Figure 2B:
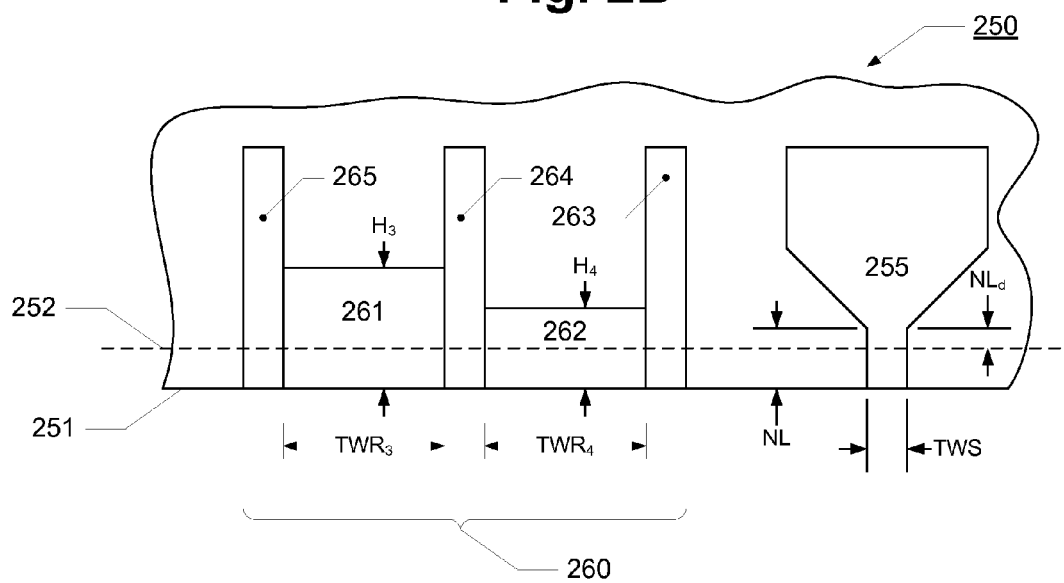
FIG. 2B is a partial cross-sectional view of an ELG embedded within a write layer of a slider bar in accordance with one aspect of the subject disclosure.

Turning to FIG. 2B, a partial cross-sectional view of an ELG 260 embedded within a write layer 250 of a slider bar is illustrated in accordance with one aspect of the subject disclosure. ELG 260 is located near a write pole 255. Write pole 255 may be part of a longitudinal magnetic recording head, a perpendicular recording head, or any other write head known to those of skill in the art. Write pole 255 includes a throat region defined by a nose length, NL, and a trackwidth, TWS. The relatively close proximity of ELG 260 to write pole 255 minimizes fabrication (e.g., dimensional) variations between write pole 255 and ELG 260. In addition, other ELGs (not shown) may be located along the slider bar near other write poles (not shown).

As further shown in FIG. 2B, ELG 260 includes a third resistive element 261, and a fourth resistive element 262 separated from the third resistive element 261 by a common lead 264, which is in electrical contact with both resistive elements. Third resistive element 261 and fourth resistive element 262 also are electrically connected to a third electrical lead 265 and a fourth electrical lead 263, respectively. Leads 263, 264, and 265 are each electrically connected to a controller (not shown) through which currents can be applied to third resistive element 261 and fourth resistive element 262, and through which resistances of third resistive element 261 and of fourth resistive element 262 can be measured. Also, third resistive element 261 and fourth resistive element 262 are each defined by a particular height, $H_3$ and $H_4$, respectively, and by a particular width, or trackwidth, $TWR_3$ and $TWR_4$, respectively.

It should be noted that because of the proximity of the third resistive element and fourth resistive element, during the lapping process, the two are lapped at essentially the same rate, and thus the linear difference between $H_3$ and $H_4$ remains substantially the same. Although $TWR_3$ and $TWR_4$ are shown as approximately equal, according to other aspects of the subject disclosure they may differ. In either case, $TWR_3$ and $TWR_4$ are preferably substantially larger than TWS. The larger the size of $TWR_3$ and $TWR_4$, the less impact there is of other ELG components on endpoint determination, as is further discussed below. In addition, larger $TWR_3$ and $TWR_4$ minimize the impact on endpoint determination of trackwidth dimensional errors during the fabrication of the ELG resistive elements. For example, with appropriate dimensions, typical dimensional errors can result in about a 1% error, rather than a 10% error that can otherwise be experienced. The selection of particular $TWR_3$ and $TWR_4$ values is further influenced by the area available on a slider bar for the ELG versus the area occupied by read/write heads.

Preferably, the leads and junctions are formed such that the resistances of the leads are negligible relative to the resistances of resistive elements 261 and 262. For example, the leads resistance may be minimized by using low resistivity materials. The leads resistance can also be minimized by minimizing the distance over which the leads are formed only from the thin films utilized in write pole fabrication by designing the via for contact between the thin films leads and the thicker conductors used in the write head process, in close proximity to the resistive elements. In addition, defining the trackwidths of the resistive elements to be substantially larger than the trackwidth of the write pole can minimize the relative impact of the leads and junction resistance because the resistance of resistive elements 261 and 262 are directly proportional to $TWR_3$ and $TWR_4$, respectively.

The write pole 255 is also defined by a height, or nose length, NL. As illustrated in FIG. 2B, once a slicing operation has been performed to form a slider bar, the write pole has a height NL, while the first and second resistive elements have heights $H_3$ and $H_4$, respectively. If the slicing operation does not cut through a resistive element, there will be no change in resistance of that resistive element until a lapping plane 251 reaches the lower edge of that resistive element.

During a lapping process, the slider bar is lapped along the lapping plane 251, over time reducing NL, along with $H_3$ and $H_4$, from the initial pre-lapped values until NL is equal to a desired, or target nose length $NL_d$. It should be noted that when the write pole, third resistive element, and fourth resistive element are located near each other along the slider bar, the differences between $H_3$, $H_4$, and NL will remain substantially constant throughout a lapping process.

To provide calibration before and up to the time the target stripe height is reached, initial lower edges of the resistive elements are below a final plane 252 which includes the write pole ABS, and upper edges of the resistive elements are above the final plane 252. These criteria can be satisfied regardless of the position of the resistive element lower edges relative to the lower edge of the write pole, and whether or not the initial lower edges of the resistive elements extend to the initial lapping plane. However, if the resistive elements do not extend to the initial lapping plane, the resistances will begin to change once the lapping plane 251 reaches the lower edges of the resistive elements.

According to one aspect of the subject disclosure, the resistive elements provide a changing signal throughout the lapping of the slider bar, from the initial lapping plane to the plane 252 which includes the write pole ABS. To ensure that the resistive elements are lapped from the initial lapping plane, and therefore begin to change resistance from that point, the lower edges of the resistive elements extend to the initial lapping plane, thereby allowing the resistive elements to be lapped from the beginning of the lapping process. To account for variations and tolerances of the slider bar slicing operation, the distance between the wafer level lower edges of the resistive elements and the plane 252 may be greater than or equal to the distance between the plane 252 and the wafer level write pole lower surface. However, with appropriate slicing of the slider bar to expose the third and fourth resistive elements, the wafer level lower surfaces of the resistive elements can alternatively be as close as or closer than the wafer level lower surface of the write pole is to the plane 252.

To provide calibration until the lapping has formed the write pole ABS (i.e., when NL is reduced to $NL_d$), the upper edges of the resistive elements extend above the plane 252, which includes the write pole ABS. In other words, the distances between the initial lapping plane and the upper edges of the third and fourth resistive elements are greater than the distance between the initial lapping plane and the plane 252. According to one aspect of the subject disclosure, while the absolute dimensions are somewhat affected by the tolerances of the slider bar slicing operation, the initial values of $H_3$ and $H_4$ may be at least about 15 microns larger than the target nose length $NL_d$. According to another aspect of the subject disclosure, the initial values of $H_3$ and $H_4$ may be at only 4 microns larger than the target nose length $NL_d$. It may be desirable to design the ELG to have the smallest initial values of $H_3$ and $H_4$ practicable given the requirements of slider bar fabrication and lapping preparation.

According to one aspect of the subject disclosure, a goal during the lapping process is to change the rate of lapping as NL approaches the target stripe height $NL_d$, including stopping the lapping at an endpoint when NL is approximately equal to $NL_d$. At that time, the lapping plane 251 is coincident with plane 252 and incorporates the air bearing surface ABS.

According to another aspect of the subject disclosure, a goal during the lapping process is to adjust the angle of lapping (e.g., by adjusting an angle at which the slider bar is held relative to the lapping plate) to ensure both the NL and the SH reach the desired values of $NL_d$ and $SH_d$, respectively (e.g., to ensure that the ABS is angled so as to pass through read sensor 205 and write pole 255 in such a way as to provide read sensor 205 with desired $SH_d$ and to provide write pole 255 with desired $NL_d$). This may be more easily understood with reference to FIGS. 3A and 3B, as set forth in greater detail below.

Figure 3A:
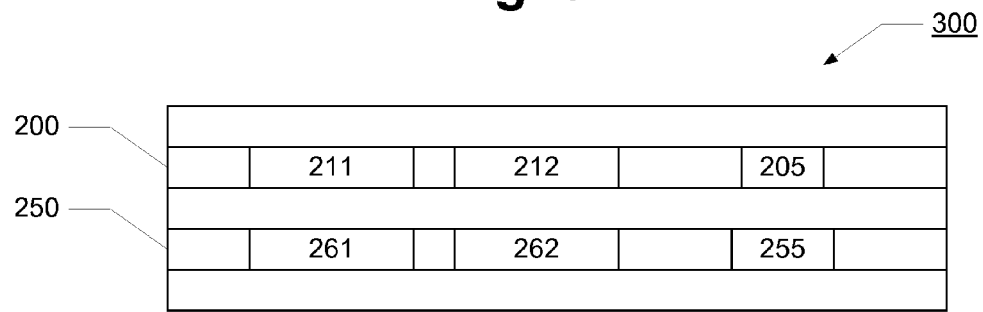
FIG. 3A is a partial view of a lapping surface of a slider bar in accordance with one aspect of the subject disclosure.
Figure 3B:
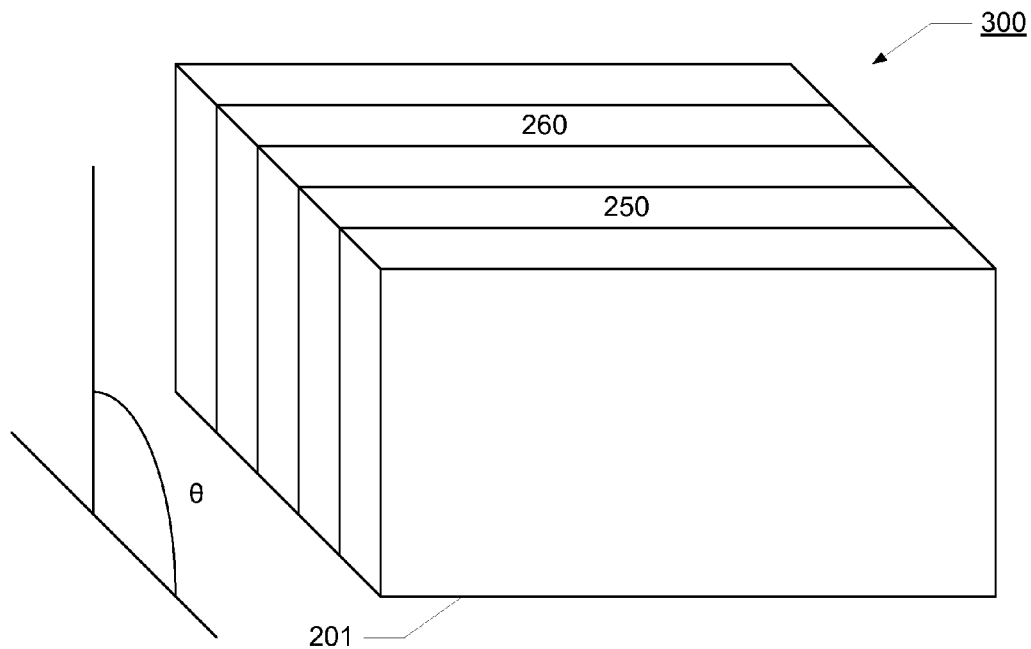
FIG. 3B is a partial perspective view of a slider bar in accordance with one aspect of the subject disclosure.

FIG. 3A is a partial view of a lapping surface of a slider bar 300 in accordance with one aspect of the subject disclosure. Slider bar 300 includes a number of parallel layers, such as layers 200 and 250, in which are disposed a read sensor 205 and a write pole 255, respectively, as set forth in greater detail above with respect to FIGS. 2A and 2B. Reader layer 200 includes a first ELG 210, represented in FIG. 3A by first and second resistive elements 211 and 212. Write layer 250 includes a second ELG 260, represented in FIG. 3A by third and fourth resistive elements 261 and 262. Reader layer 200 and write layer 250 may be surrounded by and/or separated by one or more additional layers, as can be seen with reference to FIG. 3A. Given the separation of reader layer 200 and write layer 250, a change in the angle of the lapping surface with respect to the layers of slider bar 300 may impact the relative heights of NL and SH. This may be beneficial, where due to process variations, the precise relationship between the positions of read sensor 205 and write pole 255 in the layer stack of a slider bar may vary from one slider bar to the next. Accordingly, it is desirable to monitor and adjust a lapping angle (illustrated, in accordance with one aspect of the subject disclosure, as angle θ in the partial perspective view of slider bar 300 in FIG. 3B) during the lapping procedure to ensure that the desired values of $NL_d$ and $SH_d$ can be achieved in the lapping process.

Figure 4:
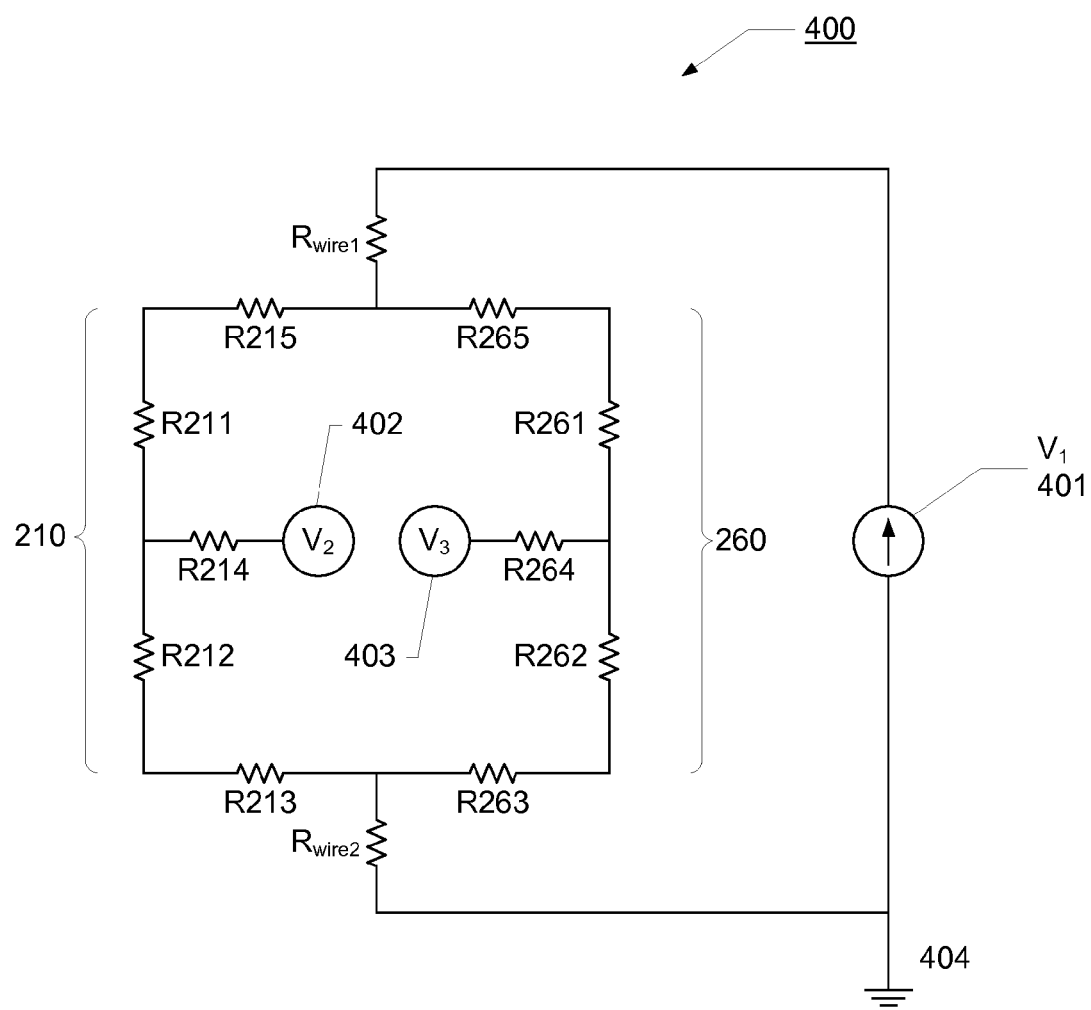
FIG. 4 is a diagram illustrating a circuit comprising first and second ELGs in accordance with one aspect of the subject disclosure.

In accordance with one aspect of the subject disclosure, this monitoring and adjustment can be accomplished by monitoring the relative resistances of (or voltages across) ELG 210 and 260. Turning to FIG. 4, a diagram illustrating a circuit comprising first and second ELGs 210 and 260 is illustrated in accordance with one aspect of the subject disclosure. Measurement circuit 400 includes a current injection site 401 from which a current (e.g., of 0.24 mA) flows through ELG 210 and ELG 260 to ground terminal 404. The wire connecting current injection site 401 to ELGs 210 and 260 has a certain resistance $R_{wire1}$, and the wire connecting ELGs 210 and 260 to ground terminal 404 has a certain resistance $R_{wire2}$. In ELG 210, first electrical lead 215, common lead 214 and second electrical lead 213 each have a resistance: $R_{215}$, $R_{214}$ and $R_{213}$, respectively. Similarly, in ELG 260, third electrical lead 265, common lead 264 and fourth electrical lead 263 each have a resistance: $R_{265}$, $R_{264}$ and $R_{263}$, respectively. The foregoing resistances are configured to be substantially less than the resistances of the first and second resistive elements 211 and 212 of ELG 210, and of the third and fourth resistive elements 261 and 262 of ELG 250. For example, in accordance with one exemplary aspect of the subject disclosure, $R_{wire1}+R_{wire2}\approx 1.5\Omega$, $R_{263}+R_{265}\approx 1.0\Omega$, $R_{213}+R_{215}\approx 1.0\Omega$, $R_{264}<0.5\Omega$, $R_{214}<0.5\Omega$, and $R_{211}$, $R_{212}$, $R_{261}$ and $R_{262}$ are each greater than about $300\Omega$. Thus, the relative impact of the leads and junction resistance will be minimized, and the resistance of resistive elements 211, 212, 261 and 262 will be nearly directly proportional to $TWR_1$, $TWR_2$, $TWR_3$ and $TWR_4$, respectively.

According to one aspect of the subject disclosure, during the lapping operation, $R_{211}$ and $R_{212}$ may be used to determine that the current stripe height of the read sensor is nearing or approximately equal to the target read sensor stripe height $SH_d$. More specifically, for ELG 210 according to one aspect of the subject disclosure, when the material properties of the first and second resistive elements are approximately identical, the first and second resistive element trackwidths $TWR_1$ and $TWR_2$ are approximately equal, and the first and second resistive element initial (pre-lapping) heights $H_1$ and $H_2$ are different, then the ratio of the resistances $R_1$ and $R_2$ measured across the first and second resistive elements, respectively, is inversely proportional to the ratio of $H_1$ and $H_2$ at any given time during the lapping process. Thus, by knowing the difference in the relative position of the upper edges of the first and second resistive element and defining the wafer level stripe heights of the first and second resistive elements such that the lower edge of each resistive element reaches the air bearing surface while lapping, the difference between $H_1$ and $H_2$ can be known for all times that $H_1$ and $H_2$ have positive values. By further knowing the difference between the read sensor initial stripe height and the initial height of one of either the first or second resistive element, the read sensor stripe height can be determined at any time during the lapping process.

According to another aspect of the subject disclosure, during the lapping operation, $R_{261}$ and $R_{262}$ may be used to determine that the current nose length of the write pole is nearing or approximately equal to the target write pole nose length $NL_d$. More specifically, for ELG 260 according to one aspect of the subject disclosure, when the material properties of the first and second resistive elements are approximately identical, the first and second resistive element trackwidths $TWR_3$ and $TWR_4$ are approximately equal, and the first and second resistive element initial (pre-lapping) heights $H_3$ and $H_4$ are different, then the ratio of the resistances $R_3$ and $R_4$ measured across the first and second resistive elements, respectively, is inversely proportional to the ratio of $H_3$ and $H_4$ at any given time during the lapping process. Thus, by knowing the difference in the relative position of the upper edges of the first and second resistive element and defining the wafer level stripe heights of the first and second resistive elements such that the lower edge of each resistive element reaches the air bearing surface while lapping, the difference between $H_3$ and $H_4$ can be known for all times that $H_3$ and $H_4$ have positive values. By further knowing the difference between the write pole initial nose length and the initial height of one of either the first or second resistive element, the read sensor stripe height can be determined at any time during the lapping process.

The values for $R_{211}$, $R_{212}$, $R_{261}$ and $R_{262}$ may be determined by measuring and comparing a total voltage $V_1$ of circuit 400, a voltage $V_2$ between common lead 214 of ELG 210 and the common ground (at ground site 404), and a voltage $V_3$ between common lead 264 of ELG 260 and the common ground (at ground site 404). Accordingly, a lapping rate at either ELG 210 or ELG 260 can be independently determined by making only two measurements across three of the pads (e.g., measuring total voltage $V_1$ of circuit 400 and voltage $V_2$ between common lead 214 common ground at site 404 provides the necessary information to determine a lapping rate for ELG 210). Moreover, a determination of when to slow and/or stop lapping, and whether to adjust an angle of lapping, may be made with only three measurements across the four pads 401, 402, 403 and 404. This may be more easily understood with reference to the equations set forth below.

In accordance with one exemplary embodiment of the subject disclosure, the remaining stripe height SH of read sensor 205 in reader layer 200 may be determined by measuring voltages $V_1$ and $V_2$ in circuit 400 and calculating the remaining height $\lambda_1$ in first resistive element 211 as follows:

$$h_1 = \frac{\Delta h}{(V_1 - V_2/V_2) - 1}$$

where $\Delta h$ is a predetermined difference in height between first resistive element 211 and second resistive element 212 (e.g., a difference between $H_1$ and $H_2$ of FIG. 2A). As the distance between an upper surface of resistive element 211 and an upper surface of read sensor 205 is known a priori, determining the remaining height $h_1$ in first resistive element 211 makes a determination of the current SH of read sensor 205 a trivial matter.

Similarly, in accordance with one exemplary embodiment of the subject disclosure, the remaining nose length NL of write pole 255 in write layer 250 may be determined by measuring voltages $V_1$ and $V_3$ in circuit 400 and calculating the remaining height $h_3$ in third resistive element 261 as follows:

$$h_3 = \frac{\Delta h}{(V_1 - V_3/V_3) - 1}$$

where $\Delta h$ is here the predetermined difference in height between third resistive element 261 and fourth resistive element 262 (e.g., a difference between $H_3$ and $H_4$ of FIG. 2B). As the distance between an upper surface of resistive element 261 and a flared region of write pole 255 is known a priori, determining the remaining height $h_3$ in third resistive element 261 makes a determination of the current NL of write pole 255 a trivial matter.

Once a determination of the remaining SH and NL of read sensor 205 and write pole 255, respectively, has been made, it is a simple matter to determine whether lapping should be slowed (e.g., as the lapping plane nears the final ABS plane) or stopped (e.g., when the lapping plane reaches the final ABS plane), and whether the angle of lapping ($\theta$) should be changed (e.g., if the difference between the remaining SH and the desired $SH_d$ varies from the difference between the remaining NL and the desired $NL_d$).

According to one aspect of the subject disclosure, using a common test current for circuit 400 allows for a determination of lapping rate and lapping angle with no current calibration error (e.g., which might arise if separate current injection sites were used for each of ELG 210 and 260). Moreover, the common test current lowers the impact of the resistances of the leads and other wiring (e.g., in a test probe). For example, as a result of the use of a common test current, the common lead of each ELG does not have any impact on the measurement of $V_2$ or $V_3$. In this regard, $V_2$ is only affected by $R_{213}$ and $R_{wire2}$, and $V_3$ is only affected by $R_{263}$ and $R_{wire2}$. Similarly, as a result of the use of a common test current, $(V_1-V_2)$ is only affected by $R_{215}$ and $R_{wire1}$, and $(V_1-V_3)$ is only affected by $R_{265}$ and $R_{wire1}$.

Figure 5:
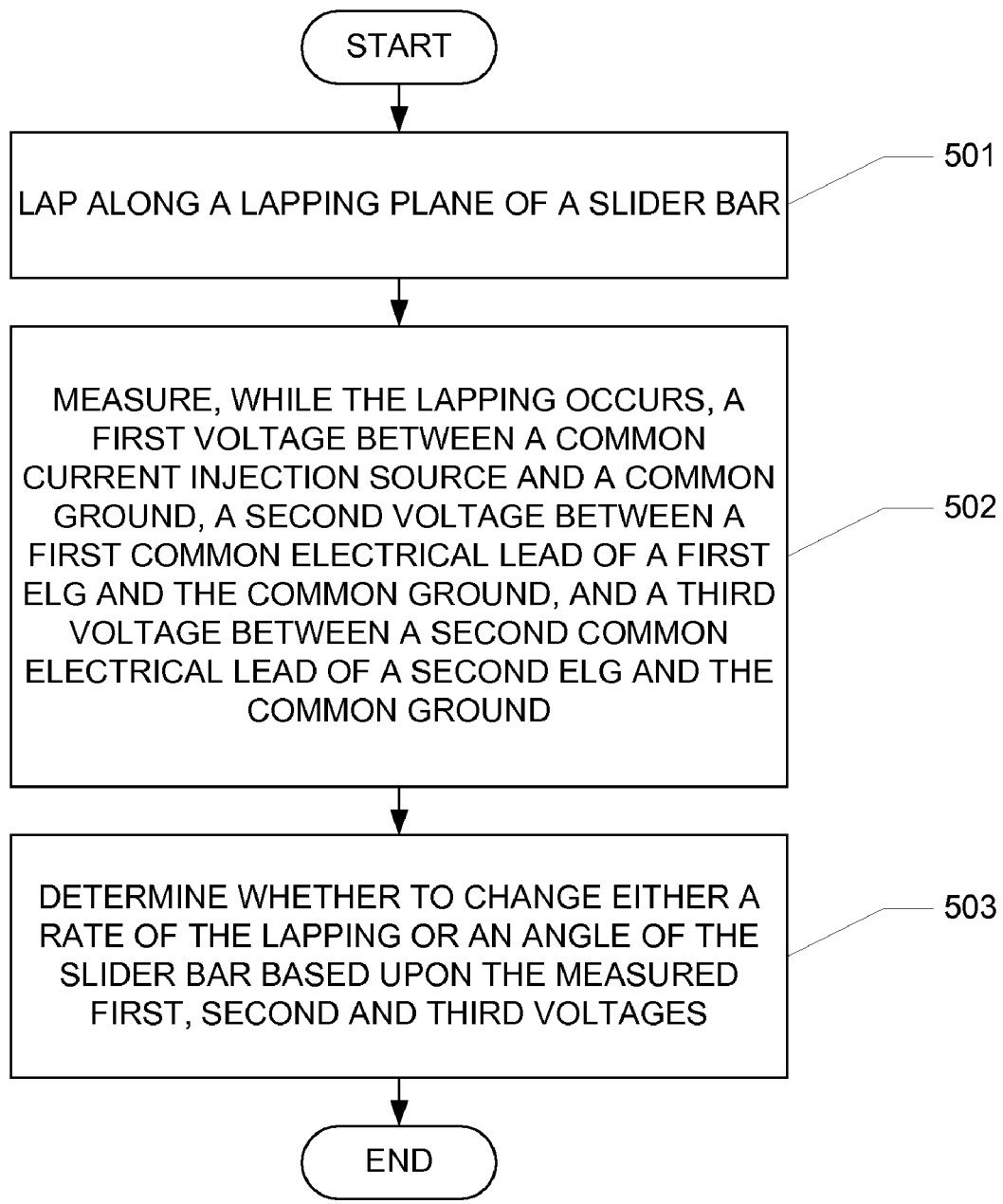
FIG. 5 is a flow chart illustrating a method for making a magnetic recording head in accordance with one aspect of the subject disclosure.

FIG. 5 is a flow chart illustrating a method for making a magnetic recording head in accordance with one aspect of the subject disclosure. The method begins with step 501, in which a slider bar is lapped along a lapping plane thereof. The slider bar includes a first differential electronic lapping guide (ELG) disposed in a first layer. The first differential ELG has a first resistive element and a second resistive element between which is disposed a first common electrical lead. The slider bar further includes a second differential ELG disposed in a second layer. The second differential ELG has a third resistive element and a fourth resistive element between which is disposed a second common electrical lead. The first and second differential ELGs share a common ground and a common current injection source. The method continues with step 502, in which are measured, while the lapping occurs, a first voltage $V_1$ between the common current injection source and the common ground, a second voltage $V_2$ between the first common electrical lead and the common ground, and a third voltage $V_3$ between the second common electrical lead and the common ground. The method continues in step 503, in which it is determined whether to change either a rate of the lapping or an angle of the slider bar based upon the measured first, second and third voltages.

Figure 6:
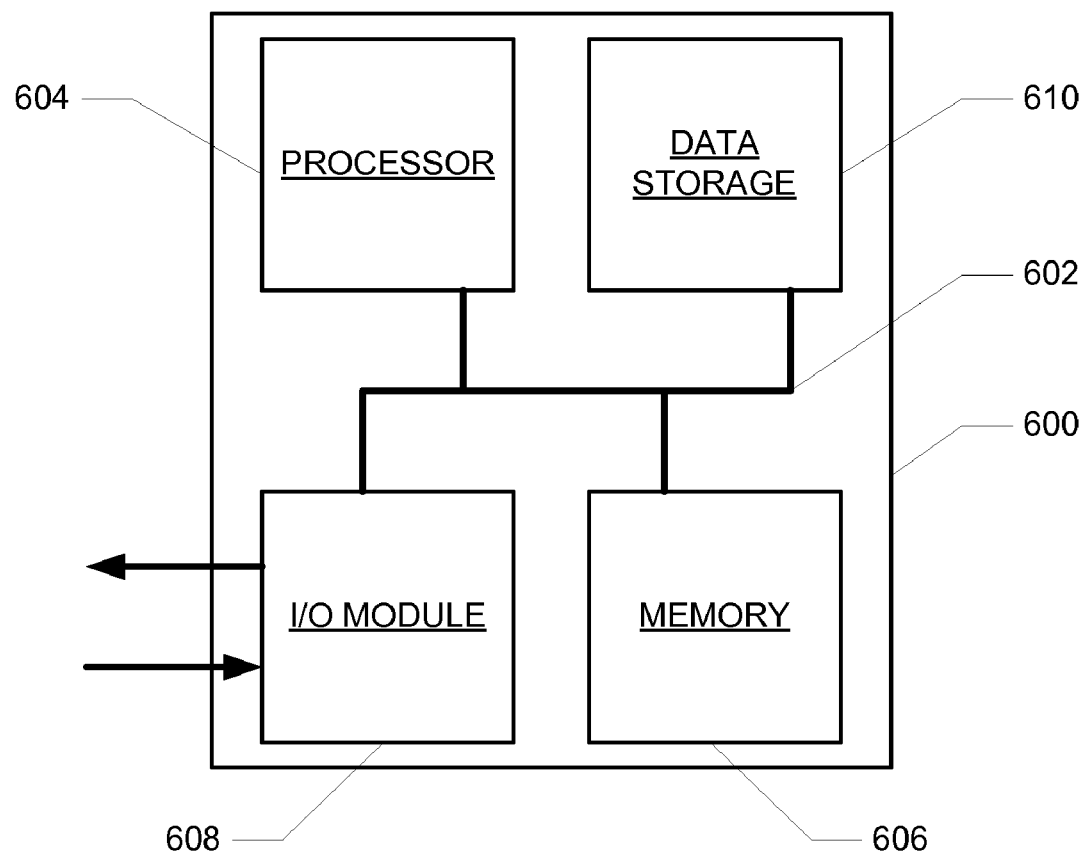
FIG. 6 is a block diagram that illustrates a computer system upon which an embodiment of the present invention may be implemented.

FIG. 6 is a block diagram that illustrates a computer system 600 upon which an embodiment of the present invention may be implemented. Computer system 600 includes a bus 602 or other communication mechanism for communicating information, and a processor 604 coupled with bus 602 for processing information. Computer system 600 also includes a memory 606, such as a random access memory ("RAM") or other dynamic storage device, coupled to bus 602 for storing information and instructions to be executed by processor 604. Memory 606 may also be used for storing temporary variables or other intermediate information during execution of instructions by processor 604. Computer system 600 further includes a data storage device 610, such as a magnetic disk or optical disk, coupled to bus 602 for storing information and instructions.

Computer system 600 may be coupled via I/O module 608 to a display device (not illustrated), such as a cathode ray tube ("CRT") or liquid crystal display ("LCD") for displaying information to a computer user. An input device, such as, for example, a keyboard or a mouse may also be coupled to computer system 600 via I/O module 608 for communicating information and command selections to processor 604.

According to one embodiment of the present invention, making a magnetic recording head may be performed by a computer system 600 in response to processor 604 executing one or more sequences of one or more instructions contained in memory 606. Such instructions may be read into memory 606 from another machine-readable medium, such as data storage device 610. Execution of the sequences of instructions contained in main memory 606 causes processor 604 to perform the process steps described herein. One or more processors in a multi-processing arrangement may also be employed to execute the sequences of instructions contained in memory 606. In alternative embodiments, hard-wired circuitry may be used in place of or in combination with software instructions to implement various embodiments of the present invention. Thus, embodiments of the present invention are not limited to any specific combination of hardware circuitry and software.

The term "machine-readable medium" as used herein refers to any medium that participates in providing instructions to processor 604 for execution. Such a medium may take many forms, including, but not limited to, non-volatile media, volatile media, and transmission media. Non-volatile media include, for example, optical or magnetic disks, such as data storage device 610. Volatile media include dynamic memory, such as memory 606. Transmission media include coaxial cables, copper wire, and fiber optics, including the wires that comprise bus 602. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. Lapping guides for use in fabrication of a magnetic recording head, comprising:
    a first differential electronic lapping guide (ELG) disposed in a first layer of the magnetic recording head, the first differential ELG having a first resistive element and a second resistive element between which is disposed a first common electrical lead; and
    a second differential ELG disposed in a second layer of the magnetic recording head, the second differential ELG having a third resistive element and a fourth resistive element between which is disposed a second common electrical lead, the second layer being different from the first layer;
    wherein the first and second differential ELGs share a common ground and a common current injection source distinct from the first common electrical lead and the second common electrical lead, and
    wherein remaining lapping distances at the first and second layers of the magnetic recording head are determined by measuring changing voltages across the first, second, third and fourth resistive elements, respectively.

2. The lapping guides according to claim 1, wherein an instantaneous height of the first differential ELG is determined by:
    measuring a first voltage $V_1$ between the common current injection source and the common ground and a second voltage $V_2$ between the first common electrical lead and the common ground, and
    monitoring a height $h_1$ of the first resistive element over a predetermined lapping period according to the formula:

$$h_1 = \frac{\Delta h}{(V_1 - V_2/V_2) - 1},$$

where $\Delta h$ is a predetermined difference in height between the first resistive element and the second resistive element.

3. The lapping guides according to claim 2, wherein the second voltage $V_2$ is measured by measuring a voltage between the common current injection source and the first common electrical lead and calculating the voltage between the first common electrical lead and the common ground.

4. The lapping guides according to claim 1, wherein an instantaneous height of the second differential ELG is determined by:
    measuring a first voltage $V_1$ between the common current injection source and the common ground and the third voltage $V_3$ between the second common electrical lead and the common ground, and
    monitoring a height $h_3$ of the third resistive element over a predetermined lapping period according to the formula:

$$h_3 = \frac{\Delta h}{(V_1 - V_3/V_3) - 1},$$

where $\Delta h$ is a predetermined difference in height between the third resistive element and the fourth resistive element.

5. The lapping guides according to claim 4, wherein the third voltage $V_3$ is measured by measuring a voltage between the common current injection source and the second common electrical lead and calculating the voltage between the second common electrical lead and the common ground.

6. The lapping guides according to claim 1, wherein the first resistive element has a first edge along a lapping plane, the second resistive element has a second edge located along the lapping plane and a resistance that is different than a resistance of the first resistive element, whereby when the first and second edges of the first and second resistive elements are lapped, the resistance of the first and second resistive elements change.

7. The lapping guides according to claim 6, wherein the first resistive element has a first upper edge that is distal from the lapping plane by a first distance, and the second resistive element has a second upper edge that is distal from the lapping plane by a second distance that is different than the first distance.

8. The lapping guides according to claim 1, wherein the third resistive element has a third edge along a lapping plane, the fourth resistive element has a fourth edge located along the lapping plane and a resistance that is different than a resistance of the third resistive element, whereby when the third and fourth edges of the third and fourth resistive elements are lapped, the resistance of the third and fourth resistive elements change.

9. The lapping guides according to claim 8, wherein the third resistive element has a third upper edge that is distal from the lapping plane by a third distance, and the fourth resistive element has a fourth upper edge that is distal from the lapping plane by a fourth distance that is different from the third distance.

10. The lapping guides according to claim 1, wherein the first layer of the magnetic recording head includes a read sensor.

11. The lapping guides according to claim 10, wherein the read sensor is selected from the list consisting of: a tunneling magnetoresistive (TMR) read sensor, a giant magnetoresistive (GMR) read sensor, an anisotropic magnetoresistive (AMR) read sensor, and a spin valve read sensor.

12. The lapping guides according to claim 10, wherein the second layer of the magnetic recording head includes a write pole of the magnetic recording head.

13. The lapping guides according to claim 1, wherein the first resistive element has a first inner edge in electrical contact with the first common electrical lead, the second resistive element has a second inner edge in electrical contact with the first common electrical lead, and the first inner edge of the first resistive element is proximate and facing the second inner edge of the second resistive element.

14. The lapping guides according to claim 1, wherein the third resistive element has a third inner edge in electrical contact with the second common electrical lead, the fourth resistive element has a fourth inner edge in electrical contact with the second common electrical lead, and the third inner edge of the third resistive element is proximate and facing the fourth inner edge of the fourth resistive element.

15. A method for making a magnetic recording head, comprising the steps of:
lapping along a lapping plane of a slider bar, the slider bar including a first differential electronic lapping guide (ELG) disposed in a first layer and a second differential ELG disposed in a second layer different from the first layer, the first differential ELG having a first resistive element and a second resistive element between which is disposed a first common electrical lead, the second differential ELG having a third resistive element and a fourth resistive element between which is disposed a second common electrical lead, the first and second differential ELGs sharing a common ground and a common current injection source distinct from the first common electrical lead and the second common electrical lead, the lapping removing a portion of the slider bar;
measuring, while the lapping occurs, a first voltage $V_1$ between the common current injection source and the common ground, a second voltage $V_2$ between the first common electrical lead and the common ground, and a third voltage $V_3$ between the second common electrical lead and the common ground; and
determining whether to change either a rate of the lapping or an angle of the slider bar based upon the measured first, second and third voltages.

16. The method according to claim 15, wherein determining whether to change the rate of the lapping includes determining whether to stop said lapping.

17. The method according to claim 15, wherein an instantaneous height of the first ELG is determined by:
measuring the first voltage $V_1$ and the second voltage $V_2$, and
monitoring a height $h_1$ of the first resistive element over a predetermined lapping period according to the formula:

$$h_1 = \frac{\Delta h}{(V_1 - V_2/V_2) - 1},$$

where $\Delta h$ is a predetermined difference in height between the first resistive element and the second resistive element.

18. The method according to claim 15, wherein an instantaneous height of the second ELG is determined by:
measuring the first voltage $V_1$ and the third voltage $V_3$, and
monitoring a height $h_3$ of the third resistive element over a predetermined lapping period according to the formula:

$$h_3 = \frac{\Delta h}{(V_1 - V_3/V_3) - 1},$$

where $\Delta h$ is a predetermined difference in height between the third resistive element and the fourth resistive element.

19. The method according to claim 15, wherein the second voltage is measured by measuring a voltage between the common current injection source and the first common electrical lead and calculating the voltage between the first common electrical lead and the common ground.

20. The method according to claim 15, wherein the third voltage is measured by measuring a voltage between the common current injection source and the second common electrical lead and calculating the voltage between the second common electrical lead and the common ground.

21. The method according to claim 15, wherein the first resistive element has a first edge along a lapping plane, the second resistive element has a second edge located along the lapping plane and a resistance that is different than a resistance of the first resistive element, whereby when the first and second edges of the first and second resistive elements are lapped, the resistance of the first and second resistive elements change.

22. The method according to claim 21, wherein the first resistive element has a first upper edge that is distal from the lapping plane by a first distance, and the second resistive element has a second upper edge that is distal from the lapping plane by a second distance that is different than the first distance.

23. The method according to claim 15, wherein the third resistive element has a third edge along a lapping plane, the fourth resistive element has a fourth edge located along the lapping plane and a resistance that is different than a resistance of the third resistive element, whereby when the third and fourth edges of the third and fourth resistive elements are lapped, the resistance of the third and fourth resistive elements change.

24. The method according to claim 23, wherein the third resistive element has a third upper edge that is distal from the lapping plane by a third distance, and the fourth resistive element has a fourth upper edge that is distal from the lapping plane by a fourth distance that is different from the third distance.

25. The method according to claim 15, wherein the first layer includes a read sensor of the magnetic recording head.

26. The method according to claim 25, wherein the read sensor is selected from the list consisting of: a tunneling magnetoresistive (TMR) read sensor, a giant magnetoresistive (GMR) read sensor, an anisotropic magnetoresistive (AMR) read sensor, and a spin valve read sensor.

27. The method according to claim 25, wherein the second layer includes a write pole of the magnetic recording head.

28. The method according to claim 15, wherein the first resistive element has a first inner edge in electrical contact with the first common electrical lead, the second resistive element has a second inner edge in electrical contact with the first common electrical lead, and the first inner edge of the first resistive element is proximate and facing the second inner edge of the second resistive element.

29. The method according to claim 15, wherein the third resistive element has a third inner edge in electrical contact with the second common electrical lead, the fourth resistive element has a fourth inner edge in electrical contact with the second common electrical lead, and the third inner edge of the third resistive element is proximate and facing the fourth inner edge of the fourth resistive element.

30. A non-transitory machine readable medium carrying one or more sequences of instructions for making a magnetic recording head, wherein execution of the one or more sequences of instructions by one or more processors causes the one or more processors to perform the steps of:

lapping along a lapping plane of a slider bar, the slider bar including a first differential electronic lapping guide (ELG) disposed in a first layer, and a second differential ELG disposed in a second layer different from the first layer, the first differential ELG having a first resistive element and a second resistive element between which is disposed a first common electrical lead, the second differential ELG having a third resistive element and a fourth resistive element between which is disposed a second common electrical lead, the first and second differential ELGs sharing a common ground and a common current injection source;

measuring, while the lapping occurs, a first voltage $V_1$ between the common current injection source and the common ground, a second voltage $V_2$ between the first common electrical lead and the common ground, and a third voltage $V_3$ between the second common electrical lead and the common ground; and determining whether to change either a rate of the lapping or an angle of the slider bar based upon the measured first, second and third voltages.

* * * * *